United States Patent
Nakao

(10) Patent No.: US 7,133,151 B2
(45) Date of Patent: Nov. 7, 2006

(54) ADAPTIVE PROCESSING FOR IMAGES OF PAGES OF A DOCUMENT

(75) Inventor: Takehisa Nakao, Osaka (JP)

(73) Assignee: Minolta Co., Ltd., Osaka (JP)

( * ) Notice: Subject to any disclaimer, the term of this patent is extended or adjusted under 35 U.S.C. 154(b) by 356 days.

(21) Appl. No.: 09/801,805

(22) Filed: Mar. 9, 2001

(65) Prior Publication Data

US 2001/0024522 A1    Sep. 27, 2001

(30) Foreign Application Priority Data

Mar. 14, 2000   (JP)   ............... 2000-070164

(51) Int. Cl.
*G06K 1/00* (2006.01)
*G06K 9/36* (2006.01)
*H04N 1/32* (2006.01)

(52) U.S. Cl. ................. 358/1.16; 382/239; 358/426.01

(58) Field of Classification Search ............... 358/1.16, 358/1.14, 1.17, 261.2, 426.01–426.05, 450, 358/3.03, 448, 498; 382/173, 175, 252, 232, 382/239; 341/51, 107; 348/415
See application file for complete search history.

(56) References Cited

U.S. PATENT DOCUMENTS

| | | | | |
|---|---|---|---|---|
| 4,975,786 A | * | 12/1990 | Katayama et al. | ......... 358/3.26 |
| 5,253,077 A | * | 10/1993 | Hasegawa et al. | .......... 358/404 |
| 5,414,800 A | | 5/1995 | Kawaguchi | ................ 358/1.16 |
| 5,539,842 A | * | 7/1996 | Schwartz | ..................... 382/232 |
| 5,889,596 A | * | 3/1999 | Yaguchi et al. | ............. 358/448 |
| 5,901,278 A | * | 5/1999 | Kurihara et al. | ........... 358/1.15 |
| 6,061,473 A | * | 5/2000 | Chen et al. | ................. 382/235 |
| 6,094,510 A | | 7/2000 | Yaguchi et al. | ............. 382/232 |
| 6,111,605 A | * | 8/2000 | Suzuki | ..................... 348/220.1 |
| 6,181,435 B1 | * | 1/2001 | Onodera | .................... 358/1.14 |

FOREIGN PATENT DOCUMENTS

| | | | |
|---|---|---|---|
| JP | 08067048 A | * | 3/1996 |
| JP | 09-284516 A | | 10/1997 |
| JP | 10-224579 | | 8/1998 |
| JP | 11-187253 | | 7/1999 |

\* cited by examiner

*Primary Examiner*—Wenpeng Chen
(74) *Attorney, Agent, or Firm*—Morrison & Foerster LLP

(57) ABSTRACT

An image processing apparatus has a compression rate predicting section for computing an improving rate of compression required for storing image data of the entire document in a image data storage section, and a compression rate correction table for storing a change table for changing the reference values for bi-level processing based on the improved rate computed by the compression rate predicting section in its image processing section. In a case where storage capacity is short while the document image data is stored in the image data storage section, image processing is applied to image data in image data processing section by the compression rate predicting section and the compression rate correction table so that the compression rate is improved. Thereby, compression rate of image data is improved and the image data of the entire document is reliably stored in the image data storage section.

13 Claims, 9 Drawing Sheets

FIG. 6

| IMPROVED RATE(%) | FIRST REFERENCE VALUE | SECOND REFERENCE VALUE |
|---|---|---|
| 0 | 255 | 0 |
| 0~5 | 245 | 0 |
| 5~10 | 235 | 5 |
| 10~15 | 225 | 10 |
| 15~20 | 215 | 15 |
| ⋮ | ⋮ | ⋮ |
| ⋮ | ⋮ | ⋮ |

ADAPTIVE PROCESSING FOR IMAGES OF PAGES OF A DOCUMENT

This application is based on Application No. 2000-70164 filed in Japan, contents of which is hereby incorporated by reference.

BACKGROUND OF THE INVENTION

1. Field of the Invention

The present invention relates to an image processing apparatus incorporated in a digital copying machine or a scanner and the like. More particularly, the present invention relates to an image processing apparatus that executes image processing such that, in the case where a storage capacity is short while image information is compressed and stored, a compression rate is improved.

2. Description of Related Art

Conventionally, there is well known an image processing apparatus capable of compressing image data acquired by reading a document for a plurality of pages, storing the compressed data in a memory or the like, and repeatedly reading out the stored data. Such an image processing apparatus is incorporated in a digital copying machine or the like. The memory in the image processing apparatus is limited in capacity, and thus, image data on the entire document has not been always stored therein. Thus, in the image processing apparatus, countermeasures against a case in which a memory capacity shortage occurs are taken. One of such countermeasures is disclosed in Japanese Patent Application Laid-open No. 10-224579. In this countermeasure, if a memory capacity shortage occurs, reading of the document is temporarily interrupted, and image data already stored in a memory is read out and printed. Then, after a sufficient memory capacity has been allocated, the reading of the remaining document is restarted.

However, in an invention disclosed in Japanese Patent Application Laid-open No. 10-224579, there has been a problem that processing functions such as electrical sorting for electrically sorting image data or copy mode processing called booklet creation is canceled. This is because it is required to store the image data on the entire document in a memory in order to execute these processing functions. That is, if a memory capacity shortage occurs, the image data on the entire document cannot be stored, and these processing functions are canceled.

SUMMARY OF THE INVENTION

The present invention has been made in order to solve the foregoing problem. It is an object of the present invention to provide an image processing apparatus capable of storing image data on the entire document in storage means even in the case where a storage capacity of the storage means is short while image data is acquired.

An image processing apparatus according to the present invention comprises: an input device for acquiring image data; an image data processor for applying predetermined processing to the image data acquired by the input device; a compressor for compressing the image data processed by the image data processor; a storage medium for storing the image data compressed by the compressor; and a controller for controlling the image data processor and the compressor so as to change processing in the image data processor and perform data processing and data compression, in a case where the image data acquired by the input device cannot be stored in the storage medium.

In this image processing apparatus, the input device acquires image data. The image data processor applies a variety of image processing functions to the acquired image data. The compressor compresses the image data to which a variety of image processing functions are applied. The compressed image data is stored in the storage medium. Here, in the case where the image data cannot be stored in the storage medium, processing in the image data processor is changed by the controller so that the image data processor and the compressor are controlled so as to perform data processing and data compressing. Specifically, the processing in the image data processor is changed so that a compression rate of image data is improved. In this manner, the compression rate of the image data is improved so that the image data can be reliably stored in the storage medium. Therefore, even in the case where the storage capacity of the storage medium is short, the image data for all pages of the document can be stored in the storage medium. In this manner, processing functions such as electrical sorting or booklet creation are reliably executed.

An image data processing method according to the present invention comprises: a step 1 of acquiring image data; a step 2 of applying predetermined data processing to the image data acquired at the step 1; a step 3 of compressing the image data to which the processing is applied at the step 2; a step 4 of storing the image data compressed at the step 3 in a predetermined storage medium; and a step 5 of changing the processing content of the data processing at the step 2 in a case where the image data cannot be stored in the storage medium at the step 4.

In this image data processing method, at the step 1, image data is first acquired. Next, at the step 2, a variety of image processing functions are applied to the image data acquired at the step 1. Then, at the step 3, the image data to which a variety of processing functions are applied at the step 2 is compressed. At the step 4, the image data compressed at the step 3 is stored in the storage medium. In the case where the image data cannot be stored in the storage medium, the processing content of the data processing at the step 2 is changed at the step 5. Specifically, the data processing at the step 2 is changed to processing such that the compression rate of image data is improved. Thereafter, the steps 2 to 5 are repeated.

In this manner, according to the data processing method of the present invention, the compression rate of image data is improved so that the image data can be reliably stored in a storage medium. Therefore, even in the case where the storage capacity of the storage medium is short, image data for all pages of the document can be stored in a storage medium. Thus, processing functions such as electrical sorting or booklet creation are reliably executed.

BRIEF DESCRIPTION OF THE DRAWINGS

For a better understanding of the present invention, reference is made to the following detailed description of the invention, just in conjunction with the accompanying drawings in which:

FIG. 6 is an illustrative view illustrating the content of a change table for changing a reference value for bi-level processing;

DETAILED DESCRIPTION OF THE PREFERRED EMBODIMENTS

Hereinafter, preferred embodiments in which an image processing apparatus according to the present invention is embodied will be described in detail with reference to the accompanying drawings. The embodiments are directed to a copying machine that incorporates an image processing apparatus according to the present invention.

First Embodiment

Figure 1:
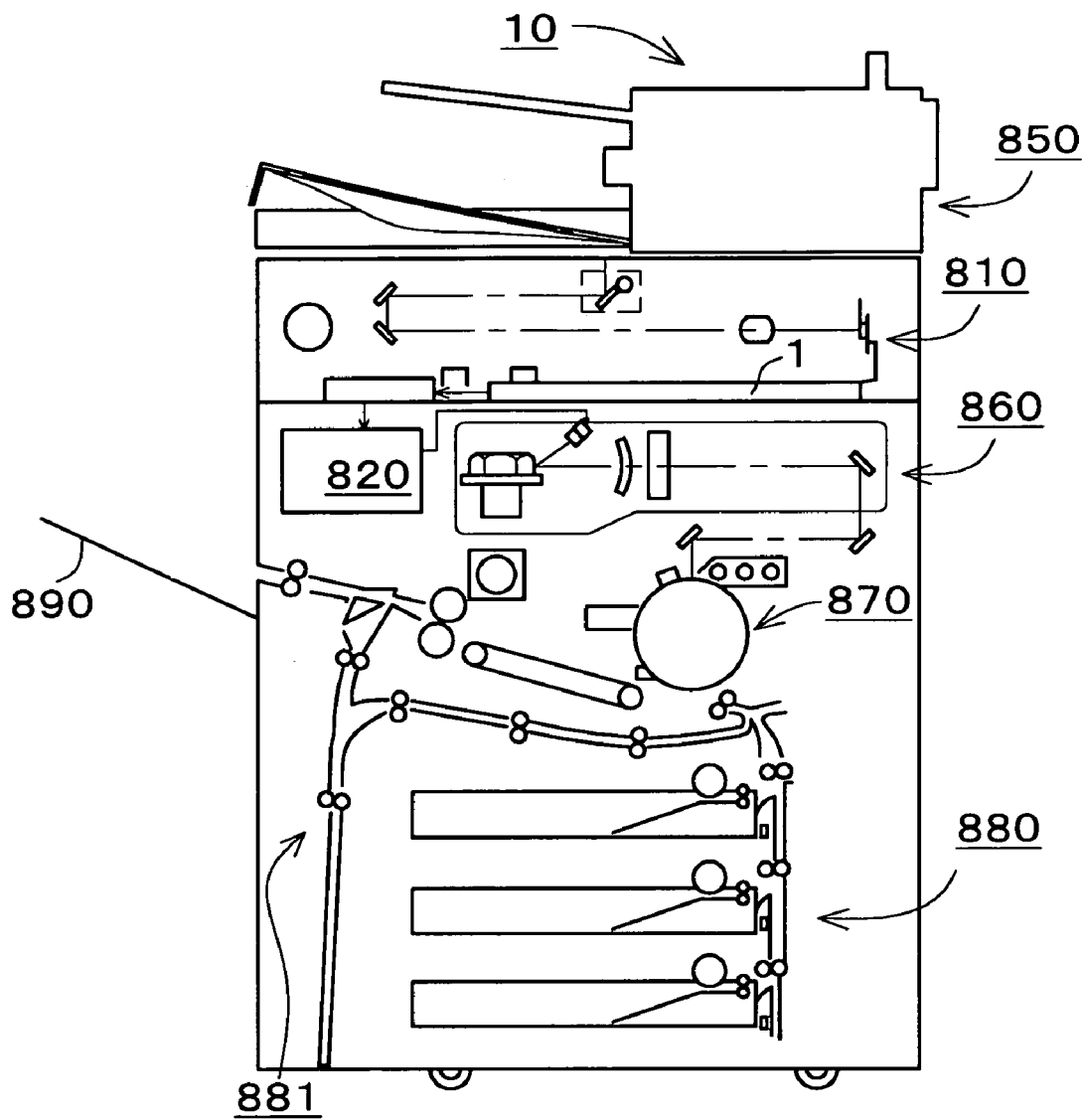
FIG. 1 is a schematic view showing a copying machine according to a first embodiment.

Now, a first embodiment will be described here. As shown in FIG. 1, a copying machine 10 according to the first embodiment reproduces an image of a document on paper. This copying machine comprises: a scanning system 810 for reading an image of a document and an automatic document carrying device 850; an image data acquisition section 1 for acquiring image data of the document; an image processing section 820 for handling the acquired image data; an optical system 860 and an image forming system 870 for forming an image based on the image data and outputting the image on paper; and a paper carrying system 880 for supplying paper, etc. The scanning system 810 reads a document image by moving a linear image sensor, for example. In addition, the image sensor maybe fixed, and the document may be read while it is moved. Further, at a paper carrying system 880, there is provided a right and reverse reversing section 881 for reversing the right and reverse of paper after image forming in order to ensure double-sided printing.

Figure 2:
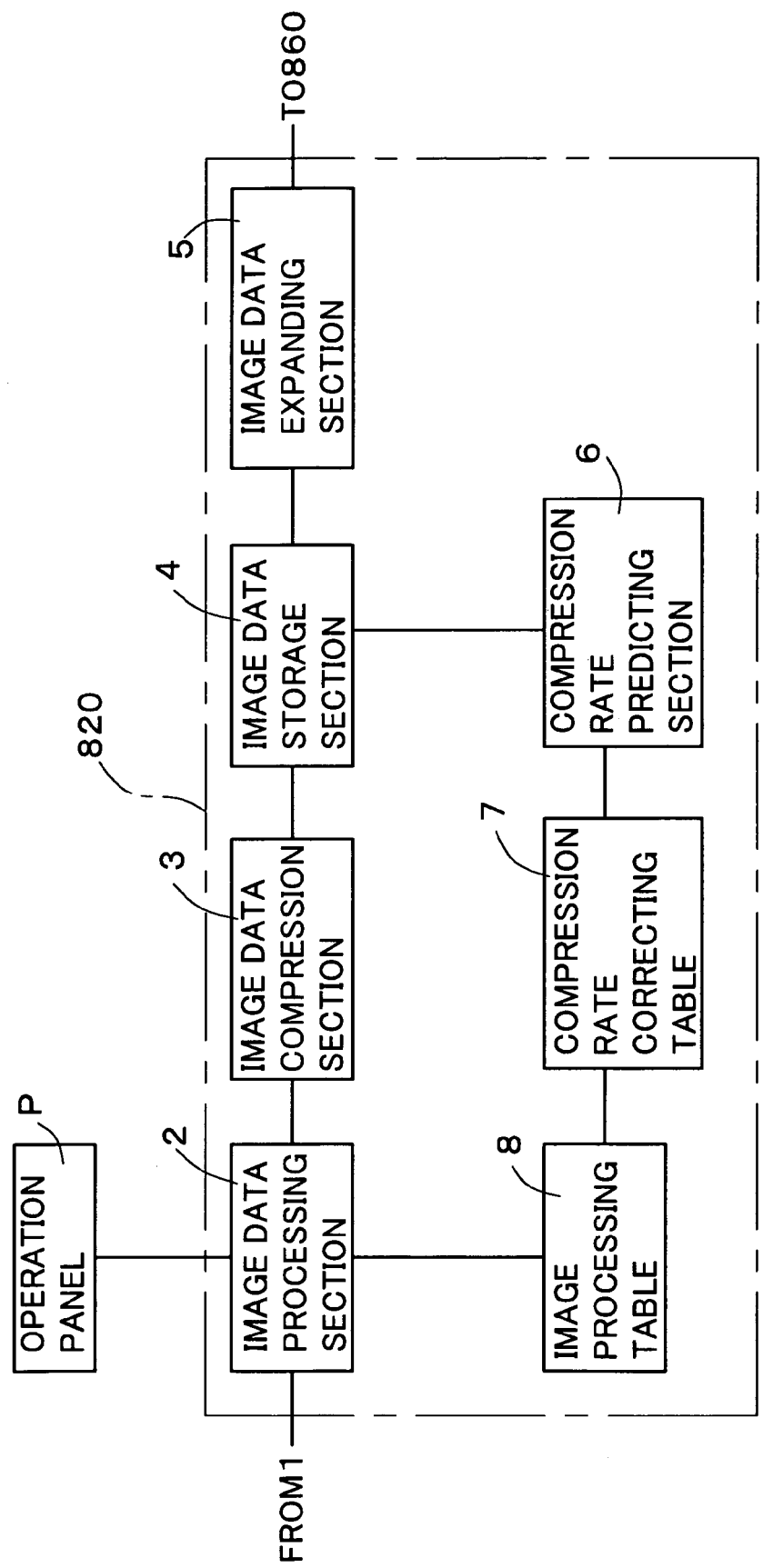
FIG. 2 is a block diagram depicting a configuration of an image processing section shown in FIG. 1.

Now, the image processing section 820 that is one of the features of the present embodiment will be described here with reference to FIG. 2. As shown in FIG. 2, the image processing section 820 comprises: an image data processing section 2; an image data compression section 3; an image data storage section 4; an image data expanding section 5; a compression rate predicting section 6; a compression rate correcting table 7; and an image processing table 8. The image data processing section 2 applies a variety of image processing functions such as bi-level processing to the image data acquired at the image data acquisition section 1. To this image data processing section 2, there is connected an operation panel P installed at the top face of the copying machine 10, the operation panel P being adopted for an operator to input a copy mode or the like. A RAM may be employed as the image data storage section 4. In the case where it is required to store a larger volume of data, a hard disk drive or the like may be employed.

The image data compression section 3 compresses the image data to which a variety of image processing functions are applied by the image data processing section 2. The image data storage section 4 stores the compression data compressed by the image data compression section 3. The image data expanding section 5 expands the compressed data, and restores it to original image data.

The compression rate predicting section 6 computes an improving rate of compression required for storing image data on the entire document in the image data storage section 4 in the case where the storage capacity of the image data storage section 4 is short. The compression rate correction table 7 stores table data for changing a reference value of bi-level processing based on the improving rate computed at the compression rate predicting section 6. The detailed content of this table data will be described later. In addition, the image processing table 8 stores table data for performing well-known image processing at the image data processing section 2.

Now, an operation of the copying machine 10 having the above configuration will be described with reference to a flow chart shown in FIG. 3. Sheets of document are carried one by one by an automatic document carrying device 850, and is provided to reading by a scanning system 810. Then, the image data of the document is acquired at the image data acquisition section 1 (S1). Specifically, light is emitted to the document, the light amount which the sensor received from the reflection light from the document is converted into an electrical signal and the image data is acquired. Then, the image data is transferred to the image processing section 820.

Accordingly in the image processing section 820, image quality correction and, if necessary, image processing such as electrical variable power processing are applied to the image data first by the image data processing section 2 (S2). This image processing functions, of course, include bi-level processing. Such image processing is performed based on the table data stored in the image processing table 8.

Figure 4:
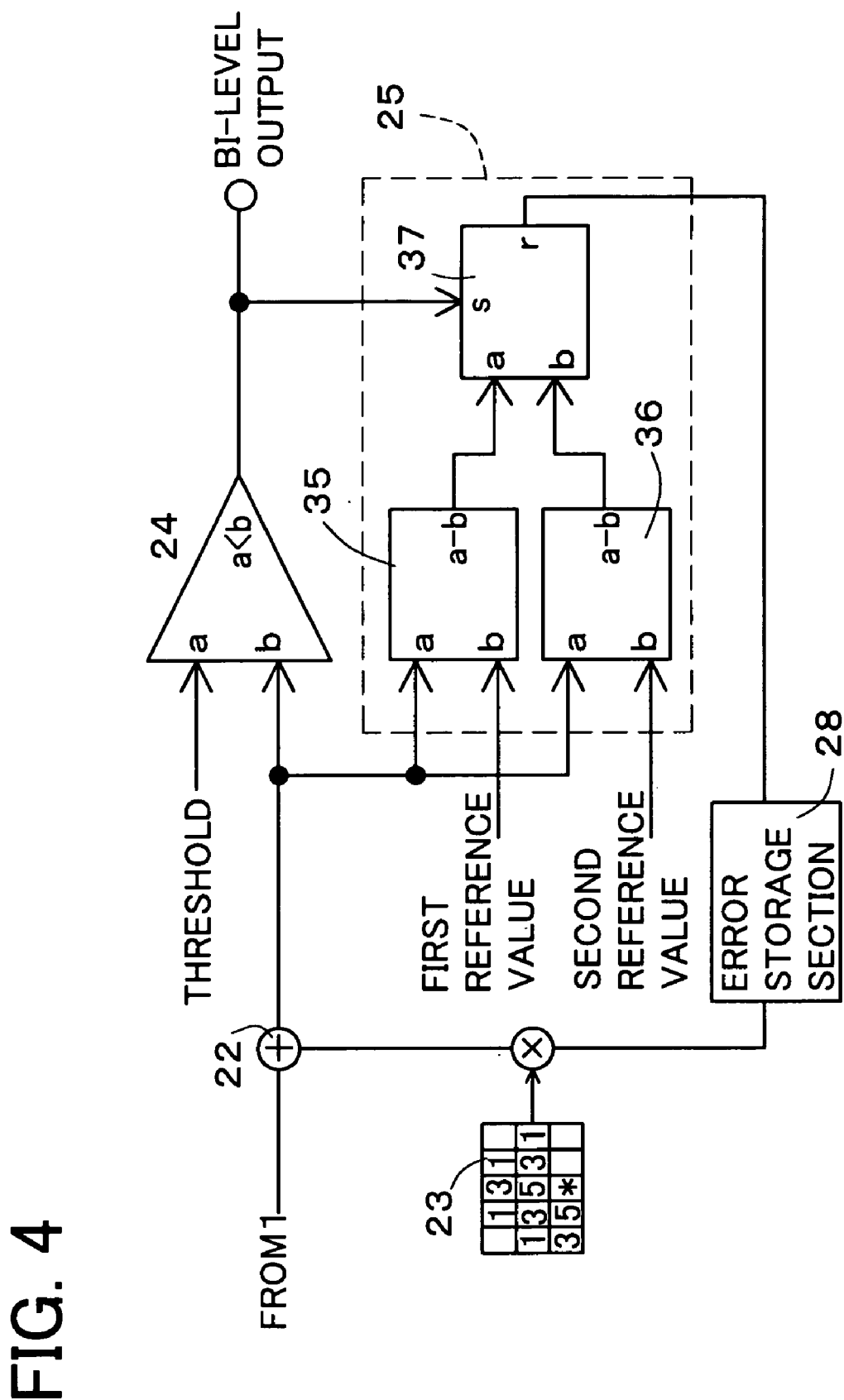
FIG. 4 is a block diagram depicting a bi-level circuit for performing bi-level processing.

Now, bi-level processing will be described below. Bi-level processing is performed by an error diffusion/bi-level circuit shown in FIG. 4. This error diffusion/bi-level circuit comprises: an error adder 22; a peripheral error weighting filter 23 for outputting data for adding a bi-level error to the error adder 22; a comparator 24 connected to the error adder 22 and outputting bi-level data in comparison with threshold; a bi-level error computing section 25 for computing a bi-level error; and an error storage section 28 for storing bi-level error data from the bi-level error computing section 25.

The error adder 22 adds multi-level image data acquired by the image data acquisition section 1 and the bi-level error computed by the peripheral error weighting filter 23 to each other, and correct the bi-level error. Then, the corrected multi-level image data is converted into a bi-level value after being compared with a threshold $T_0$ by the comparator 24. When the error corrected multi-level image data (256 gradations) is equal to or greater than $T_0$, "1" is outputted as a bi-level output. Otherwise, "0" is outputted as a bi-level output. If the bi-level output is "1", a dot is printed by an optical system 860 and an image forming system 870. If the bi-level output is "0", no dot is printed.

The bi-level error computing section 25 comprises: a first error computer 35 having error corrected multi-level image data and a first reference value inputted thereto; a second error computer 36 having error corrected multi-level image data and a second reference value inputted thereto; and a selector 37 connected to the first and second error computers 35 and 36. The first error computer 35 computes an error value in the case where a dot is printed, and outputs data acquired by subtracting the first reference value from the error corrected multi-level image data. The second error computer 36 computes an error value in a case where no dot is printed, and outputs data obtained by subtracting the second reference value from the error corrected multi-level image data. A description of setting the first and second reference values will be given later.

A selector 37 is a selection circuit. This circuit selects an error computation value from the first error computer 35 in the case where "1" is outputted by the comparator 24, and selects an error computation value from the second error computer 36 in a case where "0" is outputted. Then, the bi-level error computed at the bi-level error computing section 25 is held at the error storage section 28 by three lines, and is weighted by the peripheral error weighting filter section 23 of 5×3 in matrix size. By a series of these circuits, a bi-level error is diffused, and density storage type area gradation is performed.

Figure 3:
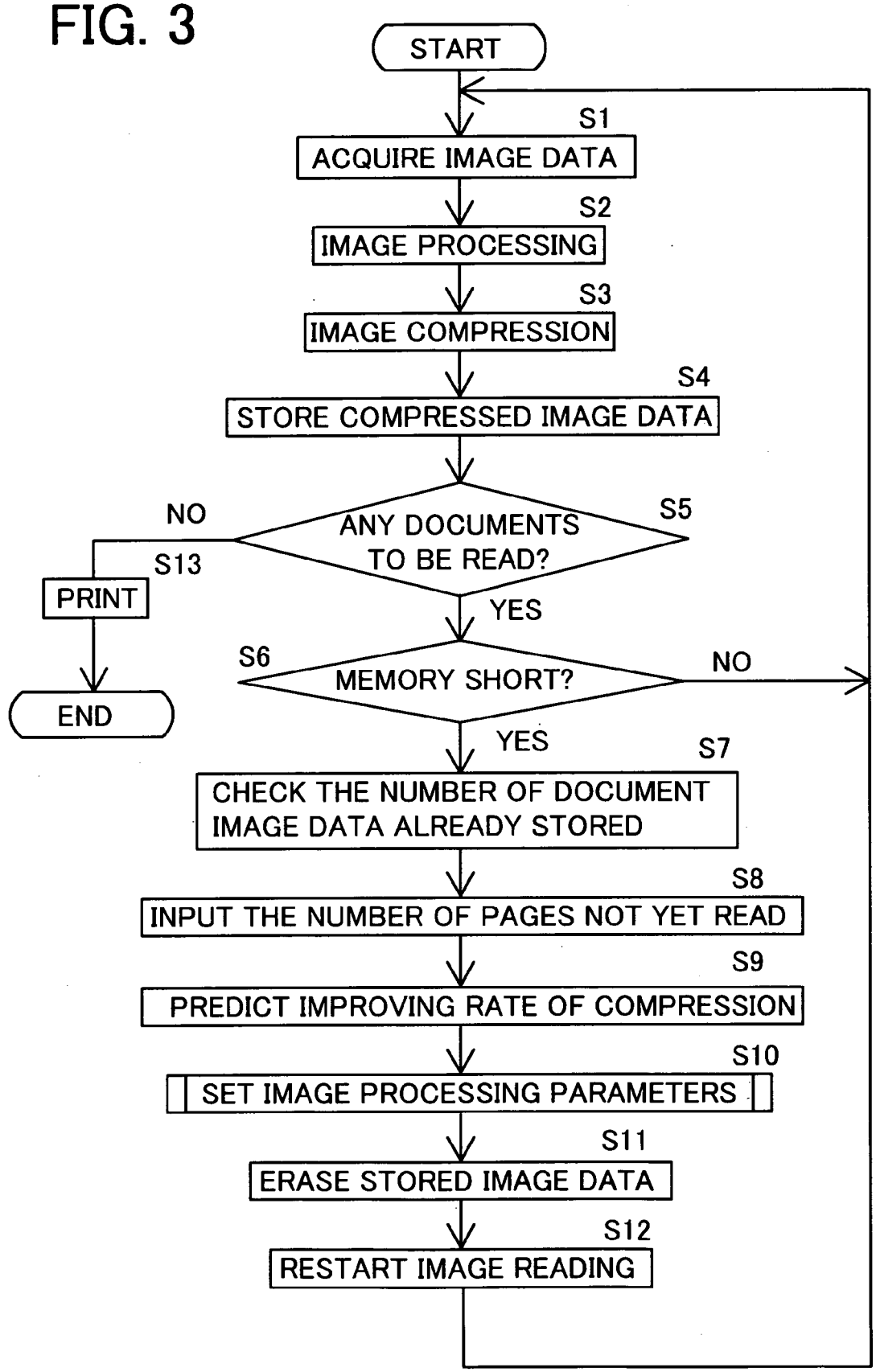
FIG. 3 is a flow chart illustrating an operation of the copying machine.

By referring now to FIG. 3, the image data to which image processing is applied by the image data processing section 2 is compressed by the image data compression section 3 (S3). The thus compressed image data is stored in the image data storage section 4 (S4). Then, it is judged whether a document further to be read is present or absent (S5). In the case where such document to be read is present (S5: YES), it is judged whether or not a memory is short, namely, whether or not the storage capacity of the image data storage section 4 is short (S6). In the case where the storage capacity is secured (S6: NO), processing reverts to S1, and the processing at S1 to S5 is repeated. In this manner, document image data is sequentially stored in the image data storage section 4.

On the other hand, in the case where a document to be read is absent (S5: NO), namely, when image data on the entire document is stored in the image data storage section 4, print processing is executed (S13). Specifically, compressed data is read out from the image data storage section 4, and is expanded by the image data expanding section 5. Next, a toner image is produced by the optical system 860 and image forming system 870 in accordance with the expanded image data. The toner image is transferred onto the paper supplied from a paper carrying system 880. When the toner image is fixed onto the paper, the document image is reproduced on the paper. Then, the paper having the image formed thereon is ejected to a paper ejection tray 890. In the case of double-sided printing, the paper is ejected to the paper ejection tray 890 through a right and reverse reversing section 881 while the images are formed on the double sides.

In the case where the storage capacity of the image data storage section 4 is short while the document image data is stored in the image data storage section 4 (S6: YES) it is first checked as to the number of documents whose image data has been already stored in the image data storage section 4 (S7). Next, the number of pages in a document of which reading is not completed is inputted (S8). The number of pages in the document may be inputted by an operator from the operation panel P or may be automatically inputted after the remaining number of documents has been checked by an automatic document carrying device 850. Then, a predicted value of an improving rate of compression required for storing the image data on the entire document in the image data storage section 4 is computed by the compression rate predicting section 6 (S9).

The improving rate of compression is predicted by the compression rate predicting section 6 as follows. First, a volume of image data of the already read document before compressing is computed from the number of pages in the read document and the size of the document in accordance with the formula below.

(Volume of image data before compressed)=(Number of pages in document)×(Document size)

Then, from the number of pages in the document stored in the image data storage section 4 and the storage capacity of the image data storage section 4, an average compression rate relevant to the document having image data stored therein is computed in accordance with the formula below.

(Current average compression rate)=(Storage capacity)/(Volume of image data before compressed)

Here, it is considered that all the same types of documents are read. A compression rate relevant to a document in which image data acquisition has not been completed by the image data acquisition section 1 is predicted to be almost equal to that relevant to a document of which image data has been already stored. Thus, the storage capacity required for storing image data on a document of which image data acquisition has not been completed is computed in accordance with the formula below.

(Required storage capacity)=(Volume of image data not acquired)×(Current average compression rate)

Next, the improving rate of compression of image data required for storing image data on the entire document in the image data storage section 4 is computed based on the storage capacity of the image data storage section 4; the capacity after the already stored image data has been compressed; and the capacity required for storing image data on the document of which image data acquisition is not completed. Specifically, the improving rate of compression is computed in accordance with the formula below.

(Improving rate of compression rate)=(Storage capacity)/((Volume of image data that has been already acquired after being compressed)+(Required storage capacity))

Figure 5:
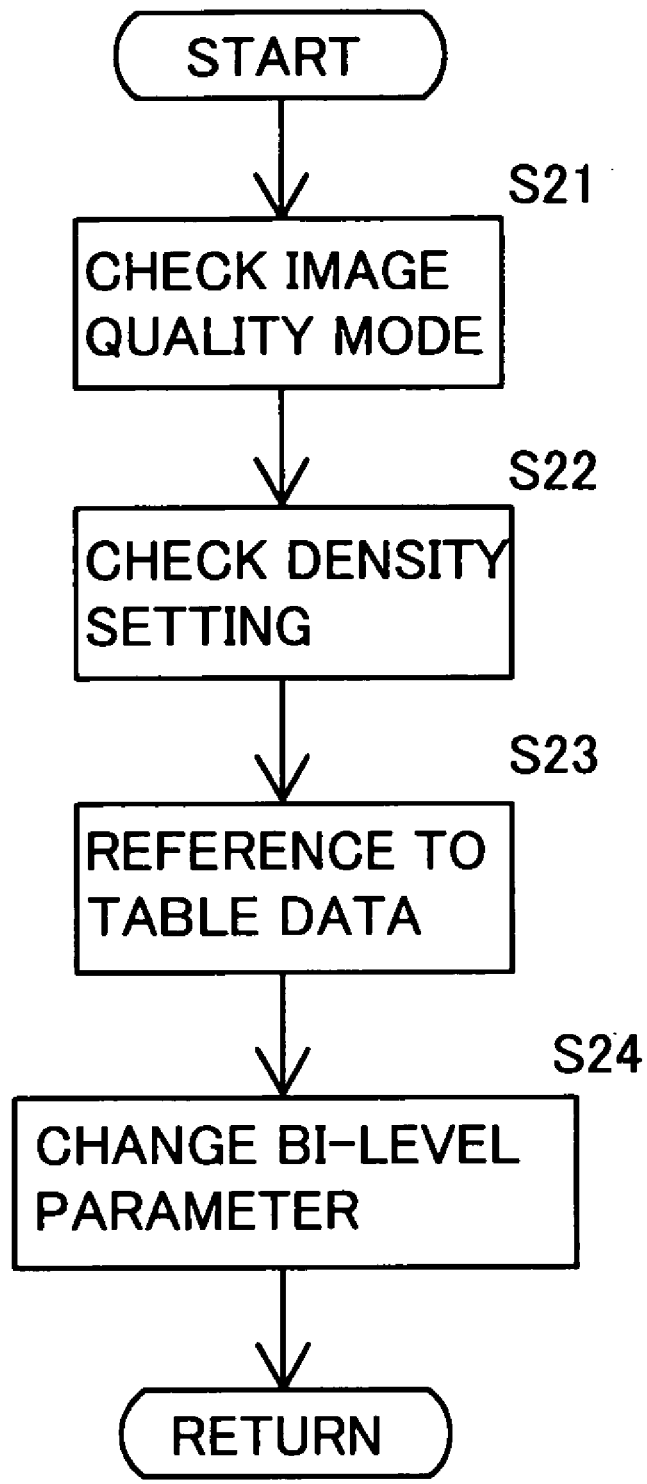
FIG. 5 is a flow chart illustrating a subroutine for setting an image processing parameter.

When the improving rate of compression is computed by the compression rate predicting section 6 as shown above, a subroutine for setting an image processing parameter, and specifically, setting a reference value for bi-level processing, is executed (S10). The subroutine processing will be described with reference to the flow chart shown in FIG. 5. First, image quality mode is checked (S21). Specifically, it is checked whether the current setting is a "character mode" or a "photography mode". These "character mode" and "photography mode" may be specified by the operator on the operation panel P or type of image may be discriminated based on read image data so as to be automatically judged. Next, density setting check is performed (S22). Specifically, it is checked as to the density set by the operator on the operation panel P. Then, the table data stored in the compression rate correction table 7 is referenced from the improving rate of compression computed by the compression rate predicting section 6, image quality mode, and density setting (S23). By doing so, as the reference result, the reference value of bi-level processing is changed (S24). Then, processing reverts to a main routine.

The reference values of bi-level processing are the first and second reference values, as described above. These reference values are determined based on the table data stored in the compression rate correction table 7. Specifically, the reference values are determined in accordance with the change table shown in FIG. 6. Namely, the first and second reference values are determined depending on an improved rate computed by multiplying a coefficient determined by the image quality mode and density setting for the improving rate of compression computed by the compression rate predicting section 6. In the case where the improved rate is "0", it denotes initial values for the first and second reference values. The first and second reference values represent gradations. In the present embodiment, 256 gradations (0 to 255) are provided, wherein 0 corresponds to white, and 255 corresponds to black.

As is evident from FIG. 6, as the improved rate increases, the first reference value is decreased, and the second reference value is increased. In this manner, when a multi-level image data is converted into bi-level image data, processing for reducing the gradation characteristic of black density section and white density section is executed. That is, the first and second reference values are changed, whereby an error that propagates across the peripheral pixel changes. In particular, the first reference value is decreased, and the second reference value is increased, whereby a propagation error increases, and a gradation change decreases. Specifically, the first reference value is decreased, whereby an isolated black dot existing in white after converted into bi-level image data decreases. On the other hand, the second reference value is increased, whereby an isolated white dot existing in black after converted into bi-level image data decreases. Therefore, when the first reference value is decreased, and the second reference value is increased, the continuity of image data is improved. Thus, the compression rate is improved.

The reference values for bi-level processing are changed, whereby gradation characteristic of high density section (black matter) and low density section (white matter) may be lost slightly in comparison with those before changing the reference values. However, only an image section required for improving the compression rate is changed, and image quality is very hardly affected. Thus, problematic image degradation does not occur.

By referring now to FIG. 3, when the reference values for bi-level processing are determined as described above, image data stored in the image data storage section 4 is erased (S11). Then, re-reading of a document is started (S12), and processing at S1 is restarted. That is, the document is re-read from the beginning. During this re-reading, a compression rate is high enough so as to store the image data on the entire document when image data is compressed. Therefore, there is avoided a situation in which a shortage in capacity of the image data storage section 4 occurs while image data is stored.

Even after the reference values for bi-level processing has been changed, in the case where the storage capacity of the image data storage section 4 is short again, processing at S7 and subsequent is executed again, and further, the current reference values are changed to those for bi-level processing such that the compression rate can be improved. Furthermore, the stored image data is erased again (S11); the document is read from the beginning (S12, S1); and image processing using new bi-level parameters is applied to the read image data (S2). As a result, the compression rate of image data is further improved. Therefore, even if the storage capacity of the image data storage section 4 is short while the document is read, the image data on the entire document can be reliably stored in the image data storage section 4.

As has been described above in detail, according to the first embodiment, there is provided a copying machine 10 comprising: a compression rate predicting section 6 for computing an improving rate of compression required for storing image data on the entire document in the image data storage section 4; and a compression rate correction table 7 for storing a change table for changing the reference values for bi-level processing based on the improved rate computed by the compression rate predicting section 6. In this manner, in the case where the storage capacity is short while the document image data is stored in the image data storage section 4, image processing is applied to image data in image data processing section 2 by the compression rate predicting section 6 and the compression rate correction table 7 so that the compression rate is improved. Then, the document is re-read while the compression rate of image data is improved. Therefore, the image data of the entire document is reliably stored in the image data storage section 4 through document re-reading. Therefore, processing functions such as electrical sorting or booklet creation are not canceled while in progress.

Second Embodiment

Figure 7:
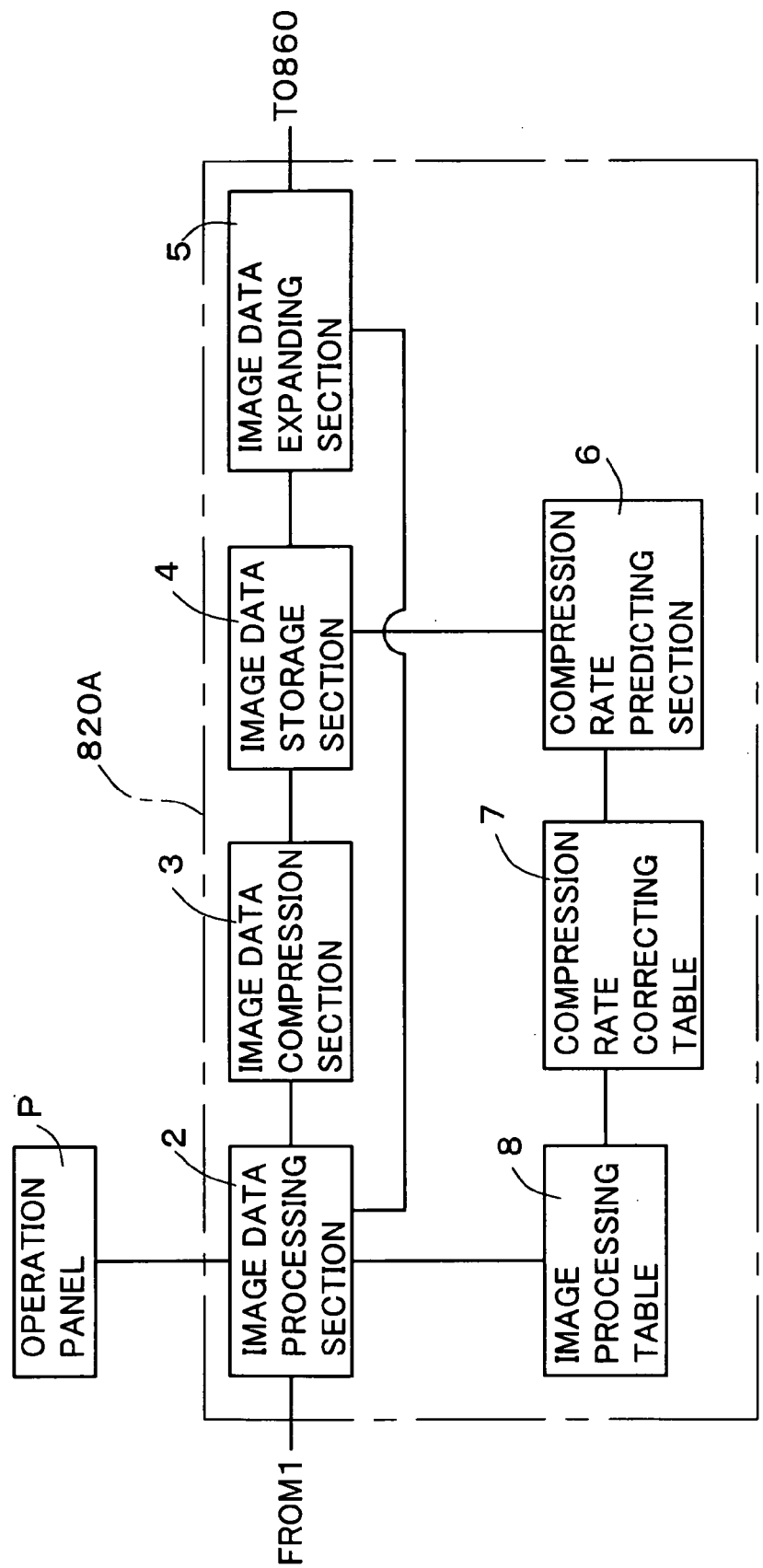
FIG. 7 is a schematic view showing a copying machine according to a second embodiment.

Next, a second embodiment will be described. The structure of a copying machine directed to the second embodiment is substantially the same as the copying machine 10 directed to the first embodiment. However, method of image data processing in a case where storing capacity of the image data storing section 4 gets short while storing image data is different from the method in the first embodiment. That is, in the first embodiment, document is read again for image processing whereas in the second embodiment, compressed image data is expanded and image processing is applied thereto again. Accordingly, as shown in FIG. 7, an image data expanding section 5 is connected to an image data processing section 2 in an image processing section 820A so that image processing should be applied to image data expanded at the image data expanding section 5 in the image data processing section 2 again. Therefore, method of image data processing will be described by referring to FIG. 8. Incidentally, same reference numerals are allocated to sections identical to those of the first embodiment and description regarding those sections will be omitted.

First, sheets of document are carried one by one by an automatic document carrying device 850, and is provided to reading by a scanning system 810. Then, the image data on the document is acquired at the image data acquisition section 1 (S31). Specifically, light is emitted to the document, the light amount which the sensor received from the reflection light from the document is converted into an electrical signal and the image data is obtained. Then, the image data is transferred to an image processing section 820A.

Accordingly in the image processing section 820A, image quality correction and, if necessary, image processing such as electrical variable power processing are applied to the image data first by the image data processing section 2 (S32). This image processing functions, of course, include bi-level processing. Such image processing is performed based on a table data stored in an image processing table 8.

Next, the image data to which image processing is applied by the image data processing section 2 is compressed by an image data compression section 3 (S33). The thus compressed image data is stored in an image data storage section 4 (S34). Then, it is judged whether a document further to be read is present or absent (S35). In the case where such document to be read is present (S35: YES), it is judged whether or not a memory is short, namely, whether or not the storage capacity of the image data storage section 4 is short (S36). In the case where the storage capacity is secured (S36: NO), processing reverts to S31, and the processing at S31 to S35 is repeated. In this manner, document image data is sequentially stored in the image data storage section 4.

On the other hand, in the case where a document to be read is absent (S35: NO), namely, when image data on the entire document is stored in the image data storage section 4, print processing is executed (S46). Specifically, compressed data is read out from the image data storage section 4, and is expanded by the image data expanding section 5. Next, a toner image is produced by optical system 860 and image forming system 870 in accordance with the expanded image data. The toner image is transferred onto the paper supplied from a paper carrying system 880. When the toner image is fixed onto the paper, the document image is reproduced on the paper. Then, the paper having the image formed thereon is ejected to a paper ejection tray 890. In the case of double-sided printing, the paper is ejected to the paper ejection tray 890 through a right and reverse reversing section 881 while the images are formed on the double sides.

In the case where the storage capacity of the image data storage section 4 is short while the document image data is stored in the image data storage section 4 (S36: YES), it is first checked as to the number of documents whose image data has been already stored in the image data storage section 4 (S37). Next, the number of pages in a document of which reading is not completed is inputted (S38). The number of pages in the document may be inputted by an operator from the operation panel P or may be automatically inputted after the remaining number of documents has been checked by an automatic document carrying device 850. Then, a predicted value of an improving rate of compression required for storing the image data on the entire document in the image data storage section 4 is computed by the compression rate predicting section 6 (S39).

When the improving rate of compression is computed by the compression rate predicting section 6 as shown above, a subroutine for setting an image processing parameter, and specifically, setting reference values (a first reference value and a second reference value) for bi-level processing, is executed (S40). The subroutine processing will be described with reference to the flow chart shown in FIG. 5. First, image quality mode is checked (S21). Specifically, it is checked whether the current setting is a "character mode" or a "photography mode". Next, density setting check is performed (S22). Specifically, it is checked as to the density set by the operator on the operation panel P. Then, the table data stored in the compression rate correction table 7 is referenced from the improving rate of compression computed by the compression rate predicting section 6, image quality mode, and density setting (S23). By doing so, as the reference result, the reference value of bi-level processing is changed (S24). Then, processing reverts to a main routine.

Figure 8:
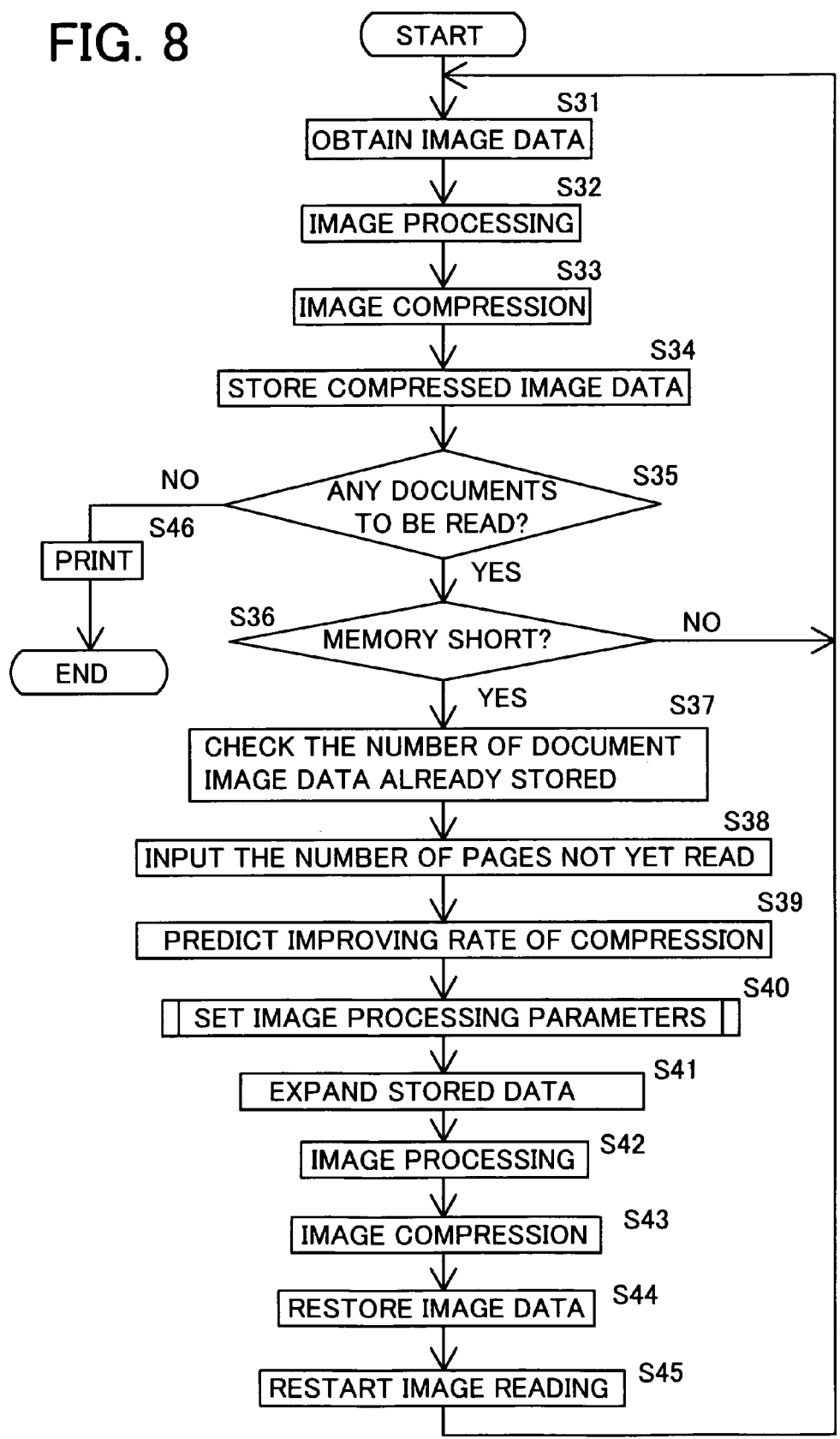
FIG. 8 is a flow chart illustrating an operation of the copying machine according to the second embodiment.

By referring now to FIG. 8, when the reference values for bi-level processing are determined as described above, the image data already stored in the image data storage section 4 is expanded by the image data expanding section 5 (S41). Then, the image data processing section 2 applies various image processing including bi-level processing based on a new reference value to the image data expanded and restores it to original image data (S42). Then, the image data new image processing has been applied thereto is compressed by the compression section 3 (S43) and stored in the data storage section 4 (S44). Since compression rate is improved this time, capacity of the image data storage section 4 is created. Thereby, shortage in capacity of the image data storage section 4 is solved.

After that, rest of the document is read again (S45) and processing goes back to S31 and similar steps are taken.

Even after the reference values for bi-level processing has been changed, in the case where the storage capacity of the image data storage section 4 is short again, processing at S37 and subsequent is executed again, and further, the current reference values are changed to those for bi-level processing such that the compression rate can be improved. Again, the image data already stored is expanded (S41) and image processing based on a reference value for new bi-level processing is applied to the expanded image data (S42). After that, image data to which the new image processing applied is compressed (S43) and stored in the image data storage section 4 (S44).

With such processing, a compression rate is high enough so as to store the image data on the entire document when image data is compressed. Therefore, there is avoided a situation in which a shortage in capacity of the image data storage section 4 occurs while image data is stored.

As has been described above in detail, according to the second embodiment, in the case where the storage capacity is short while the document image data is stored in the image data storage section 4, the image data already stored in the image data storage section 4 is expanded and processing by the compression rate predicting section 6 and the compression rate correcting table 7 is applied to expanded image data so as to improve compression rate. Thereby, shortage in capacity of the image data storage section 4 is solved and image data of rest of document can be stored in the image data storage section 4. That is, the image data of the entire document is reliably stored in the image data storage section 4. Therefore, processing functions such as electrical sorting or booklet creation are not canceled while in progress.

Third Embodiment

Figure 9:
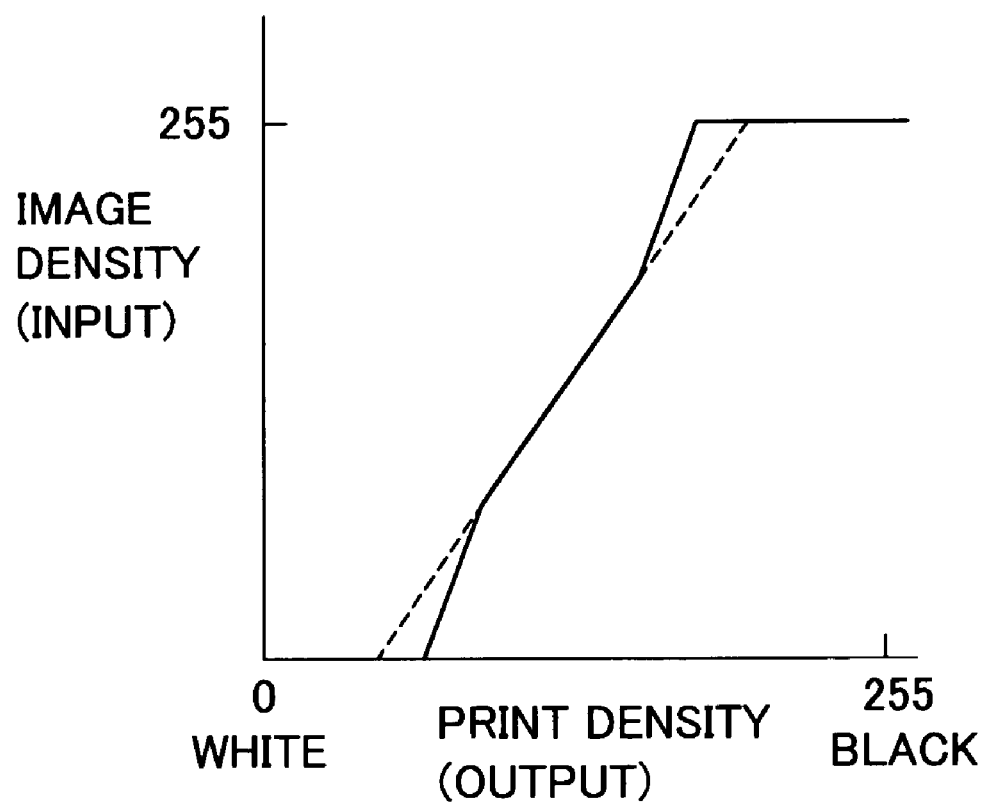
FIG. 9 is a graph illustrating the content of a change table for changing a density setting parameter according to the third embodiment.

Finally, a third embodiment will be described. The structure of a copying machine directed to the third embodiment is also substantially the same as the copying machines directed to the first and second embodiments. However, a manner of improving image data compression rate in a case where storage capacity of the image data storage section 4 while storing image data therein is different. Accordingly, the manner of improving image data compression rate is mainly described hereinafter by referring to a graph shown in FIG. 9. In this embodiment, a compression rate correcting table 7 stores a table corresponding to the graph of FIG. 9 instead of the change table shown in FIG. 6. Incidentally, same reference numerals are allocated to sections identical to those of the first and second embodiments and description regarding those sections will be omitted.

That is, parameters of density setting is changed in this embodiment whereas reference values for bi-level processing are changed in the first and second embodiments so as to improve compression rate. More specifically, as shown with solid line in FIG. 9, density characteristic around the center of the graph is not changed but characteristics at high density area (black) and low density area (white) are changed. That is, density characteristic at the high density area is changed to be more clearly black and density characteristic at the low density area is changed to be more clearly white. Change of characteristics such as above aims to improve compression rate suppressing deterioration of image quality at minimum.

With the change of density characteristics, an isolated white dot existing in characters and an isolated black dot existing in white decrease. Since continuity of image data is thus improved, compression rate of image data is improved, as well.

As has been described above in detail, according to the third embodiment, in the case where the storage capacity is short while the document image data is stored in the image data storage section 4, the compression rate predicting section 6 and the compression rate correcting table 7 changes parameters of image density setting so that compression rate of image data should be improved at the image data processing section 2. With the change of parameters for density setting, continuity of image data is improved. Compression rate of the image data is improved, as well. Thereby, the image data of the entire document is reliably stored in the image data storage section 4. Therefore, processing functions such as electrical sorting or booklet creation are not canceled while in progress.

It would be understood that the present invention is not limited to the above described embodiments which is illustrative and various modification and changes may be made without departing from the scope of the present invention.

For Example, although both the first reference value (black side) and the second reference value (white side) are changed so as to change reference value for bi-level processing in the first and second embodiment, either the first reference value or the second reference value may be changed. Similarly, as to change of parameters for density setting, both the high density area (black side) and the low density area (white side) are changed in the third embodiment. However, either the high density area or the low density area may be changed.

Other than copying machines, the present invention is applicable to scanners, facsimile machines, or the like. Not to mention, numeric values in the embodiments are merely shown as examples.

What is claimed is:

1. An image processing apparatus adapted for processing image data corresponding to a plurality of pages of a document, comprising:
    an input device for acquiring image data;
    an image data processor for applying a processing to the image data acquired by the input device;
    a compressor for compressing the image data processed by the image data processor;
    a storage medium for storing the image data compressed by the compressor; and
    a controller for controlling the image data processor, the storage medium and the compressor so that, after compressed image data corresponding to a page of the document is stored in the storage medium, the processing applied by the image data processor and a compression rate applied by the compressor to the processed image data are changed based on the number of the pages of the document so that image data corresponding to all pages of the document can be stored in the storage medium when it is determined that the storage medium cannot store further image data corresponding to a given page of the document.

2. An image processing apparatus according to claim 1, wherein the processing performed by the image data processor comprises a density conversion processing.

3. An image processing apparatus according to claim 2, wherein the controller controls the image data processor such that a high density area or a low density area of the image data increases.

4. An image processing apparatus according to claim 1, wherein the controller erases the image data already stored in the storage medium and controls the input device so at to acquire image data again when it is determined that the storage medium cannot store said further image data.

5. An image processing apparatus according to claim 1, further comprising an expandor for expanding an image data compressed and stored in the storage medium.

6. An image processing apparatus according to claim 5, wherein the controller controls the image data processor so that the expandor expands image data stored in the storage medium and the image data processor applies the changed processing to the expanded image data when said further image data acquired by the input device cannot be stored in the storage medium.

7. An image processing apparatus according to claim 6, wherein the input device acquires said further image data once unoccupied capacity is secured by the changed processing in the storage medium.

8. An image processing apparatus adapted for processing image data corresponding to a plurality of pages of a document, comprising:
    an input device for acquiring image data;
    an image data processor for applying a processing to the image data acquired by the input device;
    a compressor for compressing the image data processed by the image data processor;
    a storage medium for storing the image data compressed by the compressor; and
    a controller for controlling the image data processor, the storage medium and the compressor so that, after compressed image data corresponding to a page of the document is stored in the storage medium, the processing applied by the image data processor and a compression rate applied by the compressor to the processed image data are changed so that image data corresponding to all pages of the document can be stored in the storage medium when it is determined that the storage medium cannot store further image data corresponding to a given page of the document,
    wherein the controller calculates a compression rate required for storing an entire image data of the document in the storage medium based on an average compression rate of image data of the pages stored in the storage medium when it is determined that the storage medium cannot store said further image data.

9. An image processing apparatus according to claim 8, wherein the controller calculates the compression rate required for storing the entire image data in the storage medium based on a volume of image data of the document already stored in the storage medium and a volume of image data of the document not yet acquired by the input device.

10. An image processing apparatus according to claim 8, wherein the image data processor conducts the changed processing in accordance with the compression rate calculated by the controller.

11. A method of processing image data corresponding to a plurality of pages of a document, comprising:
    acquiring image data corresponding to a page of the document;
    applying a data processing to the acquired image data;
    compressing the image data to which the processing is applied;
    storing the compressed image data in a storage medium; and
    changing a processing parameter of the data processing and a compression rate of the compressing based on the number of the pages of the document so that image data corresponding to all pages of the document can be stored in the storage medium when it is determined that the storage medium cannot store further image data corresponding to a given page of the document.

12. A method according to claim 11, wherein the data processing comprises a density conversion processing for image data.

13. A method according to claim 12, wherein the density conversion process operates so that a high density area or a low density area of the image data increases.

* * * * *

UNITED STATES PATENT AND TRADEMARK OFFICE
CERTIFICATE OF CORRECTION

PATENT NO. : 7,133,151 B2  Page 1 of 1
APPLICATION NO. : 09/801805
DATED : November 7, 2006
INVENTOR(S) : Takehisa Nakao It is certified that error appears in the above-identified patent and that said Letters Patent is hereby corrected as shown below:

In claim 4, column 11, line 65, delete the word "at" and replace with the word --as--.

Signed and Sealed this

Twenty-seventh Day of March, 2007

JON W. DUDAS
*Director of the United States Patent and Trademark Office*